United States Patent [19]

Neve De Mevergnies

[11] Patent Number: 4,676,550

[45] Date of Patent: Jun. 30, 1987

[54] SEAT FOR VEHICLE, PARTICULARLY MOTOR VEHICLE

[76] Inventor: Marcel Neve De Mevergnies, La Pasture, Marbaix-la-Tour, Belgium

[21] Appl. No.: 706,853

[22] PCT Filed: Jun. 12, 1984

[86] PCT No.: PCT/BE84/00016

§ 371 Date: Feb. 12, 1985

§ 102(e) Date: Feb. 12, 1985

[87] PCT Pub. No.: WO85/00029

PCT Pub. Date: Jan. 3, 1985

[30] Foreign Application Priority Data

Jun. 14, 1983 [BE] Belgium .................................. 210998

[51] Int. Cl.$^4$ .................................................. A47C 7/40
[52] U.S. Cl. ..................................... 297/353; 297/283
[58] Field of Search ............... 297/289, 230, 231, 219, 297/283, 337, 353

[56] References Cited

U.S. PATENT DOCUMENTS

| 1,007,985 | 11/1911 | Smith ................................. 297/353 |
| 1,265,474 | 5/1918 | Mikulic .............................. 297/283 |
| 1,273,953 | 7/1918 | Torano . | |
| 2,075,821 | 4/1937 | Meyers ............................... 297/353 |
| 2,509,102 | 5/1950 | Kuebler .............................. 297/353 |
| 2,903,043 | 9/1959 | Kenney . | |
| 3,337,260 | 8/1967 | Proctor .............................. 197/283 |
| 3,810,263 | 5/1974 | Taylor ............................ 297/283 X |
| 3,917,341 | 11/1975 | Albinson ............................. 297/353 |

FOREIGN PATENT DOCUMENTS

| 1111965 | 7/1961 | Fed. Rep. of Germany . | |
| 2420277 | 11/1975 | Fed. Rep. of Germany . | |
| 336436 | 2/1936 | Italy ................................ 297/353 |
| 131334 | 1/1985 | Switzerland ........................ 297/284 |

Primary Examiner—Peter A. Aschenbrenner
Attorney, Agent, or Firm—Fleit, Jacobson, Cohn & Price

[57] ABSTRACT

Seat for vehicle, particularly a motor vehicle, including a seat and a back rest of which the part against which rests the back of a person sitting in the seat has a support which is mounted so as to oscillate together with the back of said person, substantially in the plane of the back rest and in an upward and downward direction with respect to the seat.

3 Claims, 1 Drawing Figure

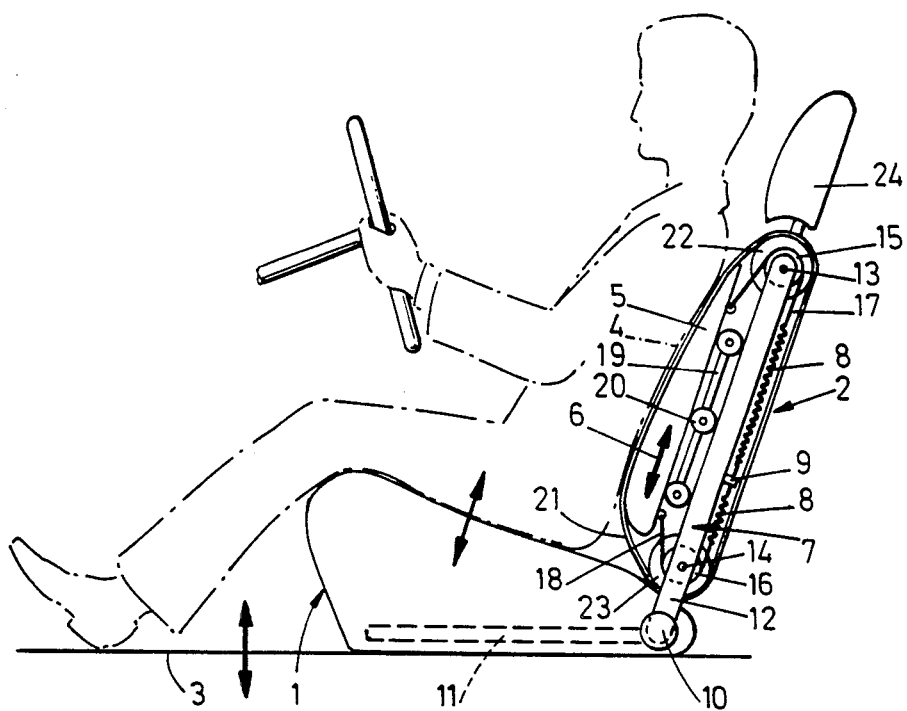

SEAT FOR VEHICLE, PARTICULARLY MOTOR VEHICLE

BACKGROUND OF THE INVENTION

The present invention relates to a seat for a vehicle, particularly motor vehicle, comprising a bottom and a back.

When a motor car, for example, moves along the road, the always-present unevenesses of the road cause oscillations of this car, and consequently of the seats thereof, along an up and down direction.

It has been noticed that this phenomenom is often the cause of acute pains in the passenger back, or even severe impairments to the integrity of some vertebrae or of the spinal cord included in the vertebral column.

SUMMARY OF THE INVENTION

One of the essential objects of the present invention is to provide a seat which may be suitable for any kind of car used for conveying passengers, such as motor car or railroad car, allowing to obviate said drawbacks and this without requiring to modify the known location or fastening of the standard seats.

For this purpose according to the invention, that portion of the seat back against which bears the back of an individual who is sitting in the seat, has a rest which is so mounted as to be swingable together with the back of this individual, substantially along the seat back plane and in an up and down direction relative to the seat.

Advantageously, this rest is mounted on a frame integral with th seat back and extending substantially along the plane thereof, through resilient return means letting this rest swing about a fixed point relative to the frame.

According to a preferred embodiment of the invention, a trim in the shape of an endless strip, is stretched about the seat back, the rest and two rollers with horizontal rotating axes mounted on the top and bottom of the seat back.

BRIEF DESCRIPTION OF THE DRAWING

Other details and features of the invention will stand out from the description, given hereinafter by way of non limitative example, of a particular embodiment of the invention, with reference to the accompanying drawing which shows diagrammatically and in vertical section, a seat from a motor car.

DESCRIPTION OF THE PREFERRED EMBODIMENT

This seat comprises a bottom 1 and a back 2, which is for example hinged to the bottom.

This bottom is mounted conventionally on the floor 3 of the car, in such a way that the fastening means thereof on this floor have not been shown.

According to the invention, that portion of the seat back against which bears the back 4 of an individual taking place in the seat, is provided with a rest 5 so mounted as to reciprocate together with the back 4 of this individual, substantially along the plane of the seat and in an up and down direction relative to the bottom, as shown by the double arrow 6.

This rest 5 is mounted on a frame 7 integral with the seat back 2 and extending substantially along the plane thereof, through resilient means 8 letting this rest 5 reciprocate along the direction of the arrows 6 relative to a fixed point 9 of the frame.

This frame may for example be comprised of metal sections as the frames used in the conventional seats of motor cars.

The base 10 of this frame lies in the back portion of bottom 1 and is hinged on a metal frame 11 integrated in a horizontal position inside the lower portion of the bottom. It may be a frame known per se, bearing the springs not shown, of bottom 1.

The frame 7 generally has a rectangular shape and is comprised of two uprights 12 and two horizontal cross-ties 13 and 14, respectively connecting the upper and lower portions of said uprights 12.

In the embodiment of the seat as shown in the FIGURE, these cross-ties 13 and 14 are comprised of rods or shafts on which are freely-rotatably mounted, respectively, two pulleys 15 and 16 lying on the inner side of frame 7, adjacent both uprights 12 thereof.

Flexible links such as belts 17 and 18, are trained over said pulleys and connect the rest 5 through resilient members 8 to the fixed point 9 lying on the opposite side of frame 7 relative to rest 5.

Thus on each side edge of the seat back, adjacent each one of the uprights 12, there is provided a pair of pulleys 15 and 16 with which cooperate respectively, belts 17 and 18, the one end of these belts being secured to rest 5, the other end being joined to the one resilient member, these members being fastened to the fixed point 9.

In the embodiment as shown in the FIGURE, this fixed point is materialized by an additional reinforcement cross-tie parallel to the shafts 13 and 14 and connecting both uprights 12.

The rest cooperates with frame 7 through two slides 18 arranged on the front sides of the uprights 12 along the lengthwise direction thereof, or on a support not shown, which is in turn fastened to these uprights 12.

It may for example be a matter of conventional slides having a portion mounted on the back side of rest 5, and a portion on the uprights 12 or on the support secured thereto, both these portions may then cooperate through rollers or bearings shown diagrammatically in the FIGURE, as indicated by reference 20.

The rest 5 is comprised in this embodiment, of a cushion which is so padded and profiled as to follow the back shape of the individual who takes place in the seat.

A trim 21 in the shape of an endless strip, is stretched about the rest 5 and two rollers 22 and 23 mounted for free rotation respectively on the shafts 13 and 14, as the pulleys 15 and 16, to then pass in front of the back side of frame 7, thus concealing the resilient members 8 and the fixed point 9.

The surface of this trim may possibly be completly or partly padded.

Finally the finishing of the seat back 2 may be completed by two side cheeks not shown in the drawing, made from a substantially rigid material and also covered with a trim.

These cheeks might for example be mounted on the outer side surfaces of uprights 12 with screws or other similar fasteners.

When necessary, a head-rest 24 may be suitably arranged on the upper shaft 13, which should be fixed in this case.

To make mounting this head-rest easier, the upper roller 22 might for example be comprised of a plurality of assembled parts.

As this is within the grasp of any man of the art, it did not seem useful to go more in the details.

The resilient members 8 are comprised in this embodiment, of return springs which allow to retain the rest 5 in a middle position when same is not stressed.

The length and resiliency of these springs, the dimensions of the frame 7 and mostly the weight of the rest 5 are so selected as to lower as much as possible the inertia action of the moving unit when the seat is subjected to up and down oscillations in the direction of arrows 6.

Thus due to the pressure exerted by the back 4 of an individual seated in the seat, against the rest 5, this latter one will follow accurately the up and down oscillating movement of the back.

These up and down oscillating movements are caused, as already stated hereinabove, by the road unevenesses, which result in impacts, very varied in nature, being conveyed to the floor 3 and being reflected on the bottom 1 rigidly secured to this floor.

Moreover due to the inertia action on the body of said individual, these oscillations may be amplified and thus become relatively large.

By means of the movable rest 5 and the low inertia of the movable unit, no relative movement occurs between the back 4 and the rest 5, during these oscillatory movements.

The back may thus follow accurately the movements of the lower portion of the body bearing on the bottom, while being suitably supported.

Tests made with individuals feeling back pains, have allowed to notice the beneficial effect on the vertebral column of the presence of this movable rest, not only over very uneven roads, but also on roads having on first sight a relatively even surface.

It is well understood that the invention is not limited to this embodiment and that many changes might be considered without departing from the scope of the present patent, notably as regards the mounting mechanism for the rest on the seat back.

One might possibly provide a removable rest which might thus be mounted directly over the front surface of backs from existing seats.

In such a case, one might possibly use a rigid frame which would be secured in an unmovable position on the seat back, and which would then bear outwardly the rest through suitable means, such as slides, so as to let this latter one oscillate on this frame along an up and down direction, as in the particular embodiment shown in the FIGURE.

I claim:

1. Seat for vehicle, particularly a motor vehicle, said seat comprising:
   a bottom,
   a back,
   a portion of said back against which bears the back of an individual sitting in the seat, said portion of said back includes a rest mounted for reciprocation relative to the bottom,
   said rest being movable relative to the bottom and being mounted on a frame integral in said back,
   said frame extending substantially along a plane of the back and cooperating with the rest through resilient return means for letting said rest reciprocate about a fixed point on the frame, only along opposite directions toward and away from the bottom,
   means revolving about a horizontal axis located at a top and a bottom of said frame, while said resilient return means connect said rest to a fixed point located on an opposite frame side relative to said rest, by being trained over said means, and
   a trim in the shape of an endless strip extends about said back over said rest and two rollers having horizontal revolving axes, one of said two rollers mounted on each of a top and a bottom of said back whereby said trim moves with said rest turning about said two rollers.

2. Seat according to claim 1 wherein the rest cooperates with the frame through slides.

3. Seat according to claim 1, wherein the axes of the top and bottom rollers coincide respectively with the top and bottom axes of said pulleys.

* * * * *